United States Patent
Augustsson et al.

(10) Patent No.: US 12,292,091 B2
(45) Date of Patent: May 6, 2025

(54) VEHICLE DISC BRAKE ARRANGEMENT, BRAKE PAD, AND VEHICLE

(71) Applicant: Volvo Truck Corporation, Gothenburg (SE)

(72) Inventors: Kent Augustsson, Bollebygd (SE); Marcel Palmgren, Torslanda (SE); Martin Petersson, Sävedalen (SE); Ramachandran Sandrasekaran, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 367 days.

(21) Appl. No.: 17/795,893

(22) PCT Filed: Jan. 20, 2021

(86) PCT No.: PCT/EP2021/051205
§ 371 (c)(1),
(2) Date: Jul. 28, 2022

(87) PCT Pub. No.: WO2021/156058
PCT Pub. Date: Aug. 12, 2021

(65) Prior Publication Data
US 2023/0099439 A1    Mar. 30, 2023

(30) Foreign Application Priority Data
Feb. 4, 2020    (IN)  .............................. 202041004864

(51) Int. Cl.
*F16D 55/226*    (2006.01)
*F16D 65/097*    (2006.01)

(52) U.S. Cl.
CPC ....... *F16D 55/226* (2013.01); *F16D 65/0979* (2013.01)

(58) Field of Classification Search
CPC . F16D 55/226; F16D 65/0979; F16D 65/0006
(Continued)

(56) References Cited

U.S. PATENT DOCUMENTS 3,042,152 A * 7/1962 Butler ................... F16D 55/228
188/250 F
3,390,744 A * 7/1968 Fawick ................. F16D 55/228
188/72.3
(Continued)

FOREIGN PATENT DOCUMENTS

CN    1746526 A    3/2006
CN    101456522 A    6/2009
(Continued)

OTHER PUBLICATIONS

International Search Report and Written Opinion for International Patent Application No. PCT/EP2021/051205, mailed Mar. 29, 2021, 14 pages.
(Continued)

*Primary Examiner* — Robert A. Siconolfi
*Assistant Examiner* — San M Aung
(74) *Attorney, Agent, or Firm* — Withrow & Terranova, PLLC

(57) ABSTRACT

A vehicle calliper disc brake comprising a brake disc connected to a vehicle wheel and having inboard and outboard side surfaces and a rotational axis; an actuator arranged in a calliper housing to displace at least one piston to actuate the disc brake; the calliper housing having facing first and second side walls on opposite sides of the brake disc, where the first side wall has at least one piston slidably mounted in a cavity between the side walls and where the second side wall is part of a calliper bridge extending from the first wall and spanning the brake disc.

9 Claims, 6 Drawing Sheets

(58) Field of Classification Search
USPC .............. 188/72.3, 152, 370, 250 F, 250 R
See application file for complete search history.

(56) References Cited

U.S. PATENT DOCUMENTS

| | | | |
|---|---|---|---|
| 5,282,521 A | | 2/1994 | Leist et al. |
| 5,464,077 A | | 11/1995 | Thiel et al. |
| 5,701,978 A | * | 12/1997 | Weiler ................ F16D 65/0979 |
| | | | 188/73.1 |
| 6,179,095 B1 | * | 1/2001 | Weiler ................ F16D 65/0979 |
| | | | 188/73.38 |
| 7,631,733 B2 | * | 12/2009 | Roberts .................. F16D 55/36 |
| | | | 188/73.1 |
| 2001/0013448 A1 | | 8/2001 | Schorn et al. |
| 2005/0284710 A1 | * | 12/2005 | Roberts .................. F16D 55/36 |
| | | | 188/73.31 |
| 2012/0298454 A1 | * | 11/2012 | Plantan ................. F16D 55/225 |
| | | | 188/73.38 |

FOREIGN PATENT DOCUMENTS

| | | |
|---|---|---|
| CN | 103486162 A | 1/2014 |
| CN | 105715707 A | 6/2016 |
| CN | 110382902 A | 10/2019 |
| DE | 7129399 U | 4/1972 |
| DE | 102005044150 A1 | 3/2006 |
| EP | 1067304 A2 | 1/2001 |
| JP | H08226469 A | 9/1996 |
| JP | 2009068566 A | 4/2009 |
| JP | 2011190829 A | 9/2011 |
| JP | 2013100890 A | 5/2013 |
| KR | 20080088942 A | 10/2008 |
| WO | 18192627 A1 | 10/2018 |

OTHER PUBLICATIONS

International Preliminary Report on Patentability for International Patent Application No. PCT/EP2021/051205, mailed Jun. 3, 2022, 18 pages.
First Office Action for Chinese Patent Application No. 202180011167. 6, mailed Jan. 15, 2024, 12 pages.
Intention to Grant for European Patent Application No. 21701301.0, mailed Dec. 20, 2023, 26 pages.
Brake Parts Inc., "Raybestos Bulletin 18-16: Floating Caliper vs. Fixed Caliper Operation," Sep. 10, 2018, available online: <URL: https://www.brakepartsinc.com/dam/jcr:554fe92c-a4ae-470d-90c3-a29b4f66906c/Technical%20Bulletin%2018-16.pdf>, 3 pages.
Notice of Opposition for European Patent Application No. 21701301. 0, mailed Mar. 7, 2025, 14 pages.

* cited by examiner

VEHICLE DISC BRAKE ARRANGEMENT, BRAKE PAD, AND VEHICLE

This application is a 35 USC 371 national phase filing of International Application No. PCT/EP2021/051205, filed Jan. 20, 2021, which claims the benefit of Indian Patent Application number 202041004864, filed Feb. 4, 2020, the disclosures of which are incorporated herein by reference in their entireties.

TECHNICAL FIELD

The present disclosure relates to a vehicle disc brake arrangement, in particular a brake pad arrangement for disc brakes, a brake pad for the disc brake, and a vehicle provided with such a disc brake arrangement.

BACKGROUND

Vehicle brake systems are commonly provided with disc brakes, wherein a brake caliper is acted on by an actuator, such as a pneumatic or hydraulic cylinder, to displace a pair of brake pads into contact with a rotating brake disc. An inner brake pad is usually attached to the front of the actuator. However, the outboard, or outer brake pad in known disc brake calipers is free floating relative to the caliper and will slide towards the brake disc during brake application. A problem with this arrangement is that the outer brake pad may not return to its original position after a brake actuation, which can cause generation of noise and heat as well as premature wear of the brake pad. This type of losses generated by insufficient clearance between the brake pad and the brake disc is often referred to as parasitic drag.

A solution to this problem is indicated in WO18192627, which discloses a brake pad retainer system for holding a brake pad in position relative to a carrier. A spring biased bracket is arranged perpendicular to a plane of the brake pad, which bracket is arranged to press the brake pad into the carrier to move the brake pad away from the disc when the disc brake is not in use. A problem with this and similar solutions is that the function relies on one or more separate sheet metal springs for securing and spreading the brake pads. Such sheet metal springs are prone to wear and may cause rattling and parasitic drag even when correctly mounted.

U.S. Pat. No. 3,390,744A discloses a self-energizing disc brake comprising a wear shoe and a housing limb, the wear shoe and housing limb being equipped with confronting inclined surfaces.

U.S. Pat. No. 3,042,152A discloses fluid actuated disc brakes.

The object of the invention is to provide an improved calliper disc brake with a brake pad arrangement that solves the above problems.

SUMMARY

In the subsequent text, the terms "inboard" and "outboard" are intended to describe the relative locations of component parts or surfaces along a transverse vehicle wheel axle, in relation a central longitudinal axis of the vehicle. Alternative terms such as "inner" and "outer" can also be used for this purpose. The terms "axial direction" and "radial direction" describe directions relative to the rotational axis of a brake disc, unless otherwise specified.

According to one aspect, the disclosure relates to a vehicle floating calliper disc brake comprising a brake disc connected to a vehicle wheel and which brake disc has inboard and outboard side surfaces and a central rotational axis. The calliper disc brake further comprises a calliper housing having facing first and second side walls on opposite sides of the brake disc, where the first side wall has at least one actuator mounted in a cavity between the side walls. A suitable actuator is preferably a piston-cylinder arrangement actuated by a suitable fluid or an electric actuator. The subsequent text describes a fluid actuator. The second side wall is part of a calliper bridge extending from the first wall and is arranged spanning the brake disc. A first brake pad is mounted to the at least one piston on the calliper piston side and is arranged to contact the inboard side of the brake disc during braking. A second brake pad is mounted to the second wall on the calliper bridge side and is arranged to contact the outboard side of the brake disc during braking. The brake pads comprise a brake lining arranged for frictional contact with the brake disc, which brake lining is fixed to a carrier or support arranged to be mounted to the disc brake.

The vehicle calliper disc brake is connected with the vehicle by bracket means having a first leading reaction arm and a second trailing reaction arm, each reaction arm projecting through an aperture of the calliper housing. Two pin means are provided to slidably mount the first wall of the calliper with the bracket means along an axis parallel with the rotational axis of the brake disc. The at least one fluid actuator is arranged in the calliper housing to displace the at least one piston in order to actuate the disc brake. The at least one piston is displaced out of the first wall, causing a simultaneous displacement of the first and second brake pads into frictional engagement with the brake disc. The actuating means can be a hydraulically or pneumatically powered cylinder connected to a source of fluid power on-board the vehicle.

A mechanical locking means is provided between the calliper bridge and the second brake pad, whereby the second brake pad is releasably attached to the second side wall on the calliper bridge side. The mechanical locking means comprises an elongate dove tail sheet metal part or profile on the second brake pad and at least one projection on the second wall of the calliper bridge. The dove tail sheet metal part is fixed to the carrier portion of the brake pad, facing away from the brake disc. The elongate dove tail sheet metal part extends in the radial direction of the brake disc when the brake pad is in its mounted position. The dove tail sheet metal part comprises a central section attached to the second brake pad and two side sections extending away from the central section in the axial direction and side-by-side in the radial direction. The central section is preferably an elongate flat section joining the two side sections. The side sections are arranged to converge towards the at least one facing projection in the axial direction of the brake disc, away from the central section. The side sections are further arranged to be resiliently displaced away from each other when contacted by the at least one projection to form a snap-on mechanical locking means. The parallel outer end portions of the side sections are separated by a gap having a predetermined width. The width of the gap is selected to be smaller than the outer dimensions of a free end portion or head portion of projection in order to provide a snap-on connection. The outer peripheral dimensions of a rear or stem portion supporting said head portion is reduced relative to the head portion, but is sufficient to maintain the outer end portions of the side sections in contact with the supporting rear portion when a projection has been snapped into the dove tail sheet metal part. The parallel outer end portions of the side sections can further have a short diverging portion along their parallel edges. This diverging portion of the side sections will function as a guide for the projections when they come into initial contact with the dove tail sheet metal part.

The projections can comprise a cylindrical stem portion with an enlarged head portion. Alternatively, the stem portion can have a conical portion tapering towards the head portion. The head portion is preferably rounded in the axial direction of the stem portion. The cross-section of the head portion in the axial direction can have a spherical, oval, conical or a generally cylindrical shape, in order to facilitate displacement of the side sections of the dove tail sheet metal part during mounting of the brake pad. Once the head portion has been displaced past narrowest part of the gap between the side sections, the resilient action of the side sections will force them into contact with a rounded or conical part of the head portion located adjacent the stem portion. This action will cause the brake pad to be drawn into contact with the second side wall. The stem portion can be attached to a base surface by press fitting or by the provision of a threaded portion at the end of the stem portion.

The calliper bridge side mechanical locking means comprises at least two projections. The at least two projections are separated in the radial direction of the brake disc and are arranged to cooperate with the dove tail sheet metal part. The dove tail sheet metal part has an elongate profile that is open at both ends. According to a first example, the second brake pad is arranged to be mounted axially, by snapping the dove tail sheet metal part onto each projection. According to a second example, the second brake pad is arranged to be mounted radially, by sliding the dove tail sheet metal part radially inwards onto each projection.

According to a first example, the projections are located in a radial recess in the second wall on the calliper bridge side. In this case, the dove tail sheet metal part can extend into the radial recess to connect with the projections so that the brake pad carrier can be positioned and supported by the second wall. According to a second example, the dove tail sheet metal part is located in a radial recess in the carrier of the second brake pad. In this case, the projections can extend into the radial recess to connect with the dove tail sheet metal part so that the brake pad carrier can be positioned and supported by the second wall.

According to a second aspect, there is provided a brake pad having a mechanical locking means comprising a dove tail sheet metal part to be mounted in a vehicle calliper disc brake as described above.

According to a third aspect, the invention relates to a vehicle, which vehicle comprises a vehicle calliper disc brake as described above.

An advantage of the invention is that the outer brake pad will automatically return to its original position after a brake actuation, which ensures that generation of noise and heat is avoided. The arrangement will always provide sufficient clearance between the brake pad and the brake disc in order to prevent parasitic drag. In addition, the use of sheet metal springs for spreading the brake pads can be eliminated, which reduces the number of parts susceptible to wear.

The combination of at least one projection and a dove tail sheet metal part into a mechanical locking means prevents the brake pad from being displaced in the circumferential direction of the brake disc. After mounting the brake pad it is only necessary to fix or retain it in the radial direction to ensure that the brake pad is correctly positioned.

The arrangement provides alternative ways of mounting the outboard brake pad, as it allows mounting to be performed both in the axial and in the radial direction. This option is useful when the available space around the disc brake is limited.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION OF EXAMPLE EMBODIMENTS OF THE INVENTION

Figure 1:
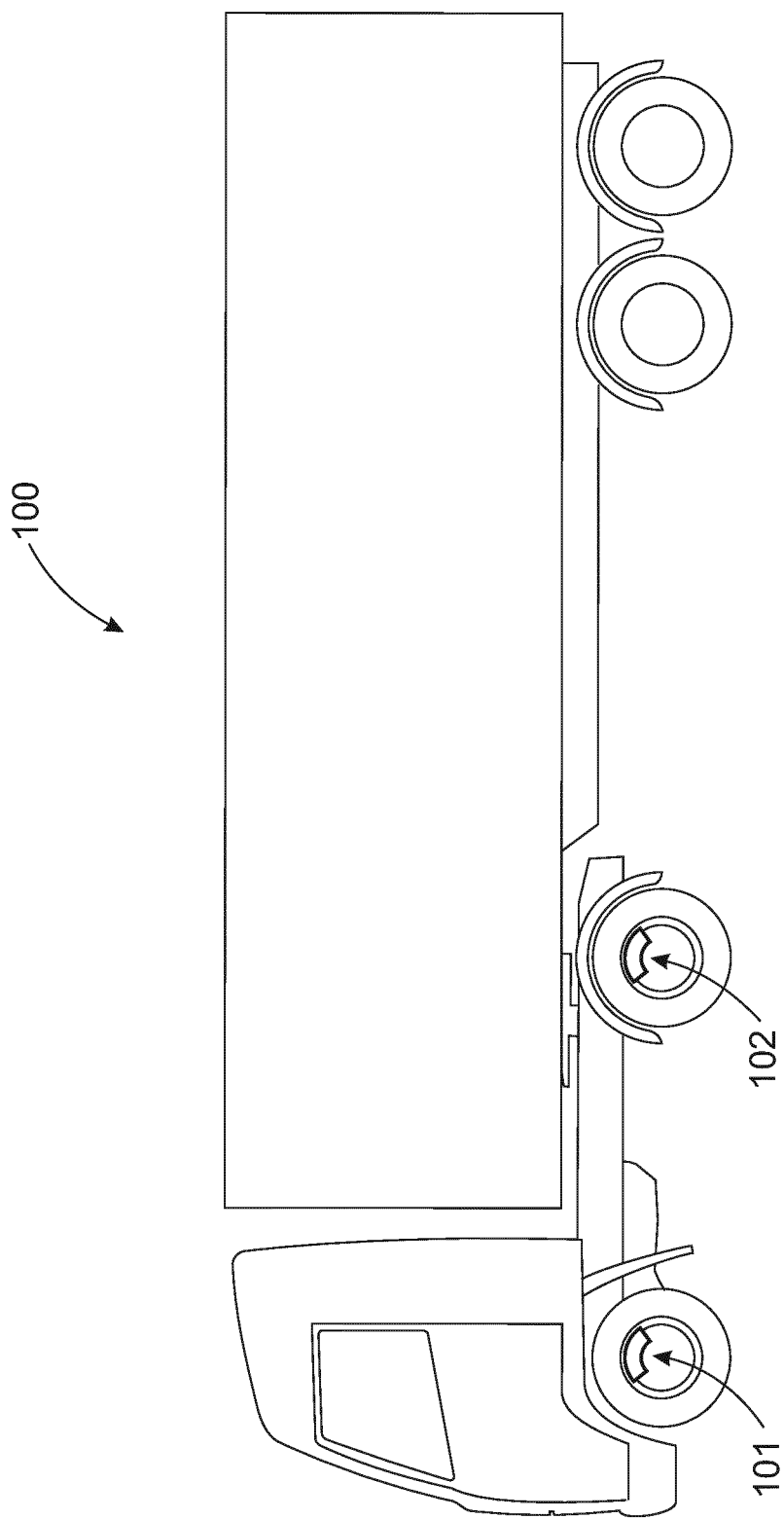
FIG. 1 shows a schematically indicated vehicle with a disc brake arrangement

FIG. 1 shows a schematically indicated vehicle 100 provided with disc brake arrangements 101, 102 according to the present teaching. Such a disc brake arrangement will be described in detail in connection with FIGS. 2 to 6 below.

Figure 2:
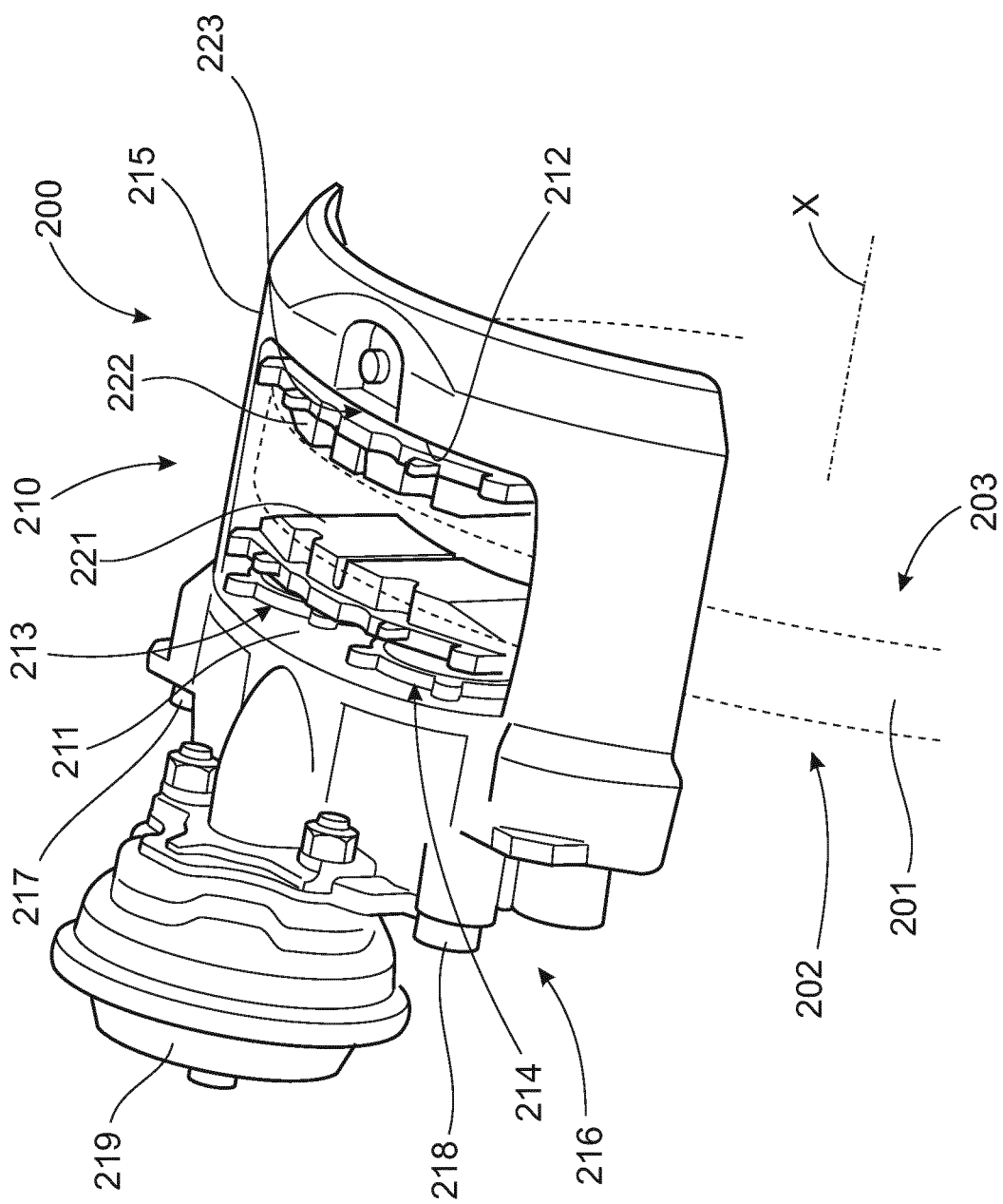
FIG. 2 shows a perspective front view of a floating calliper disc brake with a brake pad arrangement.

FIG. 2 shows a perspective front view of a floating caliper disc brake 200 with a brake pad arrangement. FIG. 2 shows a vehicle calliper disc brake 200 comprising a brake disc 201 connected to a vehicle wheel and having inboard and outboard side surfaces 202, 203 and a rotational axis X. An actuator 219 is arranged in a calliper housing 210 to displace a pair of pistons 213, 214 in order to actuate the disc brake. The actuator shown is a fluid actuator connected to a source of hydraulic or pneumatic pressure. However, an electric actuator can also be employed. The calliper housing 210 has facing first and second side walls 211, 212, respectively, on opposite sides of the brake disc 201, where the first side wall 211 has two pistons 213, 214 slidably mounted in a cavity between the side walls 211, 212 and where the second side wall 212 is part of a calliper bridge 215. The calliper bridge 215 extends from the first wall 211 and is arranged to span across the brake disc 201. A bracket means 216 is connected with the vehicle (not shown) and has a first leading and a second trailing reaction arms, each reaction arm projecting through an aperture of the calliper housing. Two pin means 217, 218 are provided to slidably mount the first wall 211 of the calliper with the bracket means along an axis parallel with the rotational axis X of the brake disc 201. When the pistons 213, 214 are actuated and displaced out of the first wall 211 the first brake pad 221 will come into contact with the brake disc 201, causing an initial displacement of the calliper housing 210 and the calliper bridge 215 to the left in FIG. 2, away from the brake disc 201. The effect of this displacement is to cause a simultaneous displacement of the first and second brake pads 221, 222 into frictional engagement with the brake disc 201. Continued actuation of the pistons 213, 214 will cause a braking action as both brake pads come into frictional engagement with the brake disc 201.

A first brake pad 221 is mounted to the front ends of the pistons 213, 214 arranged side-by-side in the first side wall 211 on the calliper piston side of the caliper disc brake 200. A second brake pad 222 is mounted to the second wall 212 on the calliper bridge side of the caliper disc brake 200. FIG. 2 further indicates the location of a mechanical locking means 223 for mounting the second brake pad 222. The mechanical locking means 223 is provided on the calliper bridge 215, whereby the second brake pad 222 is releasably attached to the second side wall 212 on the calliper bridge side.

Figure 3:
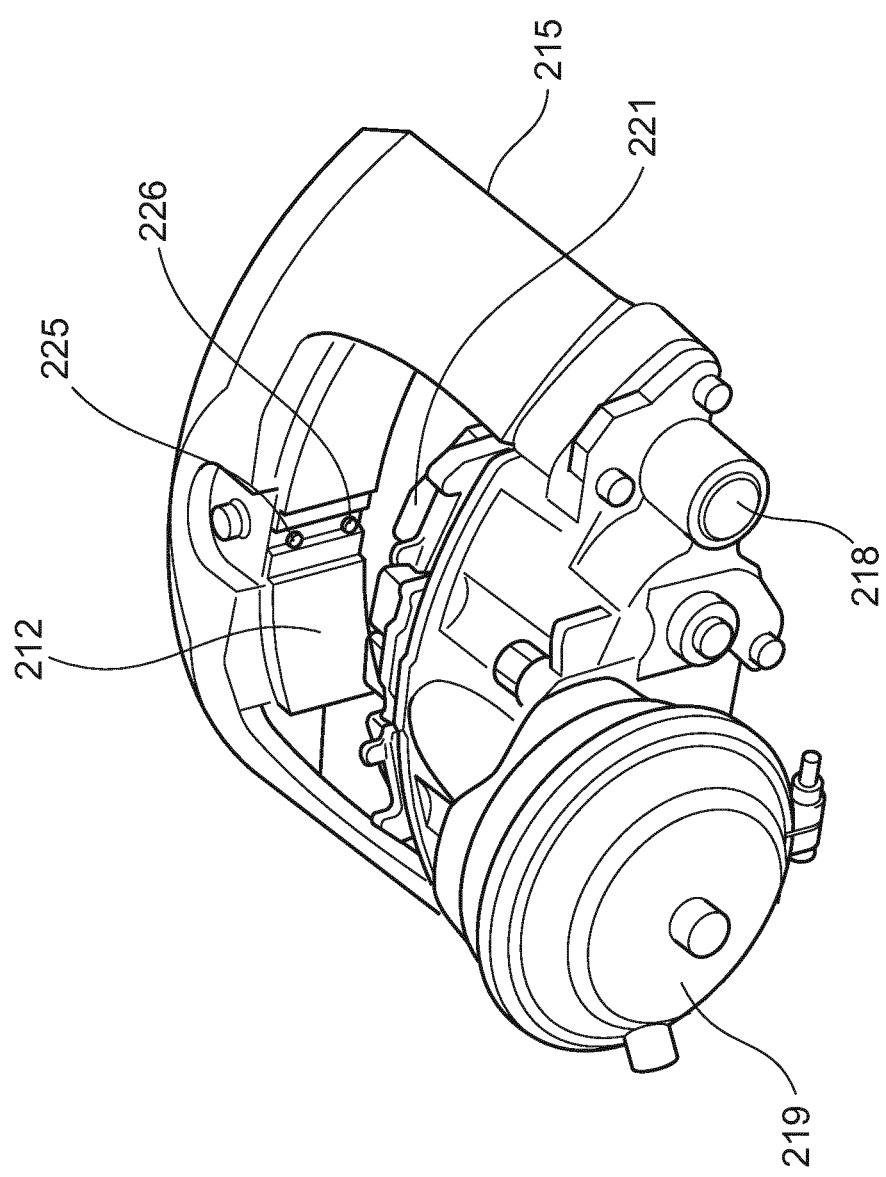
FIG. 3 shows a perspective rear view of a floating calliper disc brake with a brake pad arrangement.
Figure 4:
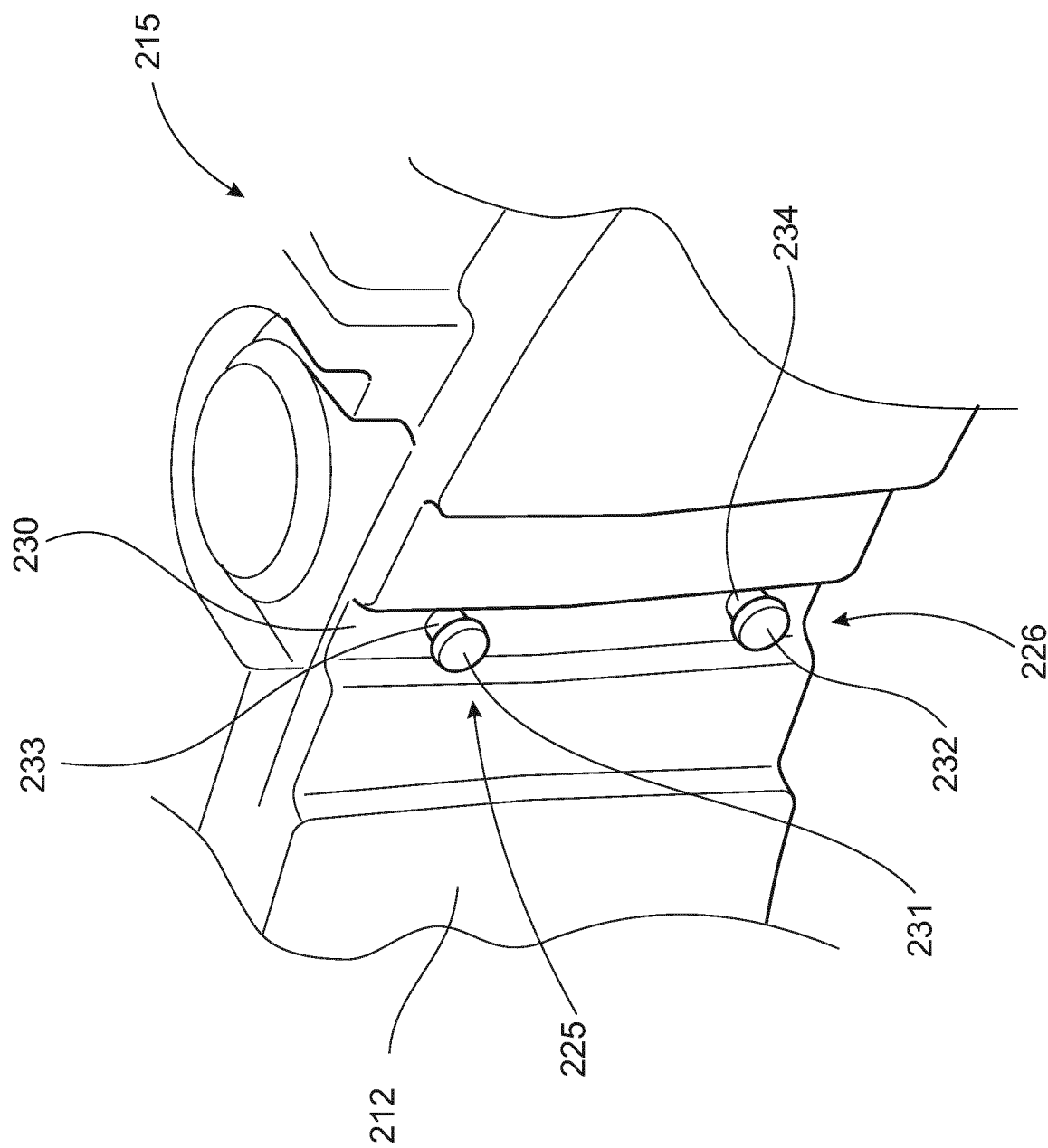
FIG. 4 shows an enlarged view of a first part of a locking means

FIG. 3 shows a perspective rear view of a floating caliper disc brake with a brake pad arrangement according to the present teaching, as previously described in FIG. 2. In FIG. 3 the second brake pad 222 has been removed to reveal the second side wall 212 on the calliper bridge 215. FIG. 3 further shows a first part of the locking means used for attaching the outboard brake pad 222 (see FIG. 2) to the second side wall 212. The first part of the locking means shown comprises two projections 225, 226 which are located in a radial recess 230 (see FIG. 4) in the second side wall 212 and are separated in the radial direction of the brake disc. The projections 225, 226 extend towards the brake disc in the axial direction thereof. FIG. 4 shows an enlarged view of first part of the locking means in FIG. 3. As schematically shown in FIG. 4, the projections 225, 226 are located in a radial recess 230 in the second side wall 212. The projections 225, 226 each comprise a cylindrical or conical stem portion 233, 234 with an enlarged head portion 231, 232. The head portion 231, 232 has a rounded periphery in the axial direction of the stem portions 233, 234. The head portion 231, 232 has a larger diameter than any part of the stem portion 233, 234, giving the projection 225, 226 a general mushroom shape. The cross-section of the head portion 231, 232 in the axial direction can have a spherical, oval, conical or a generally cylindrical shape.

Figure 5:
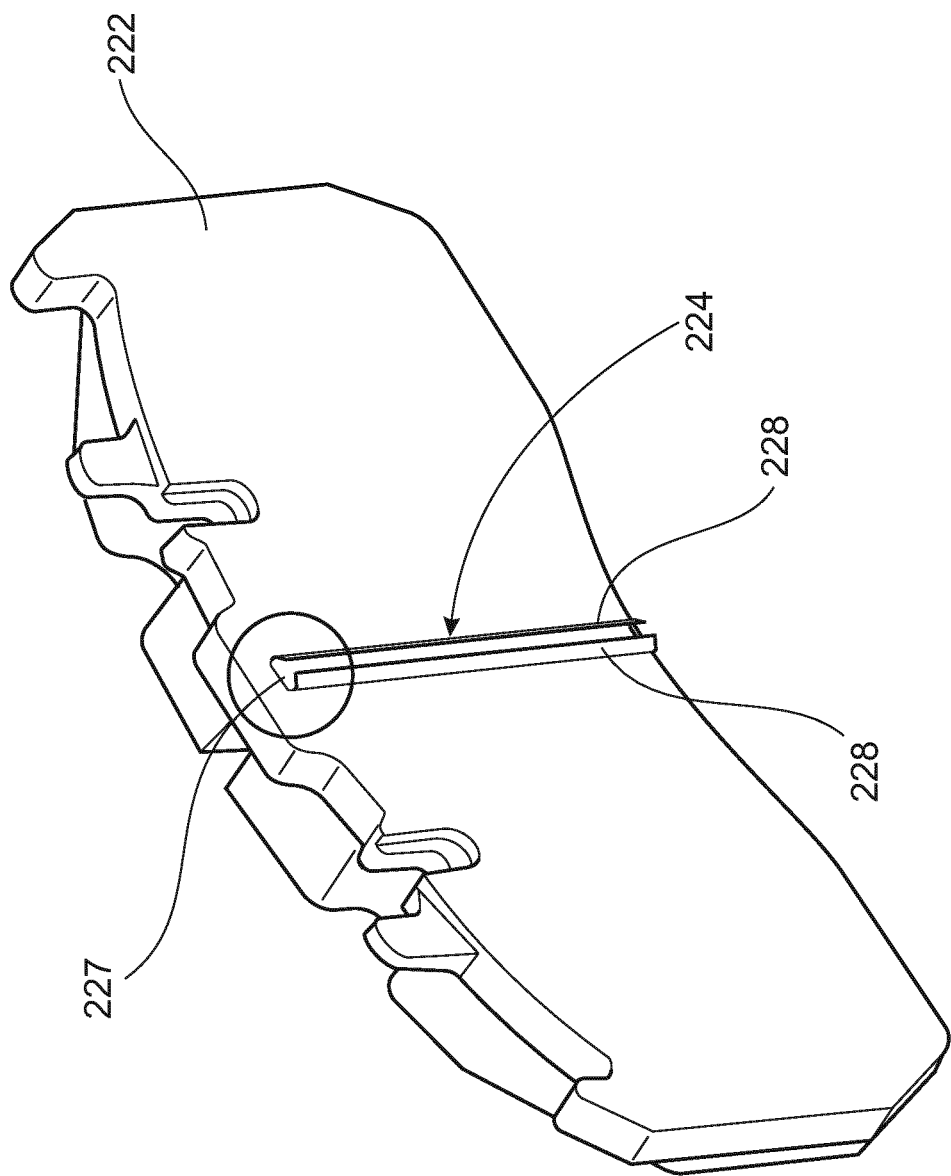
FIG. 5 shows a schematically illustrated second part of a locking means.

FIG. 5 shows a schematically illustrated second brake pad 222 with a second part of the locking means according to the present teaching. The figure shows the second part of the locking means fixed to the carrier of the second brake pad 222. The second part of the locking means comprises a dove tail sheet metal part 224 mounted to the second brake pad 222 in the radial direction of the brake disc. The dove tail sheet metal part 224 is arranged to be connected to the projections 225, 226 fixed in the radial recess in the second wall 212 of the calliper bridge 215, which projections are indicated in FIGS. 3 and 4. The dove tail sheet metal part 224 comprises a central section 227 attached to the second brake pad 222 and two side sections 228 extending in parallel side-by-side in the radial direction along the entire length of the central section 227. In this example, the dove tail sheet metal part 224 is open at both ends and extends over a major part of the radial extension of the brake pad carrier.

Figure 6:
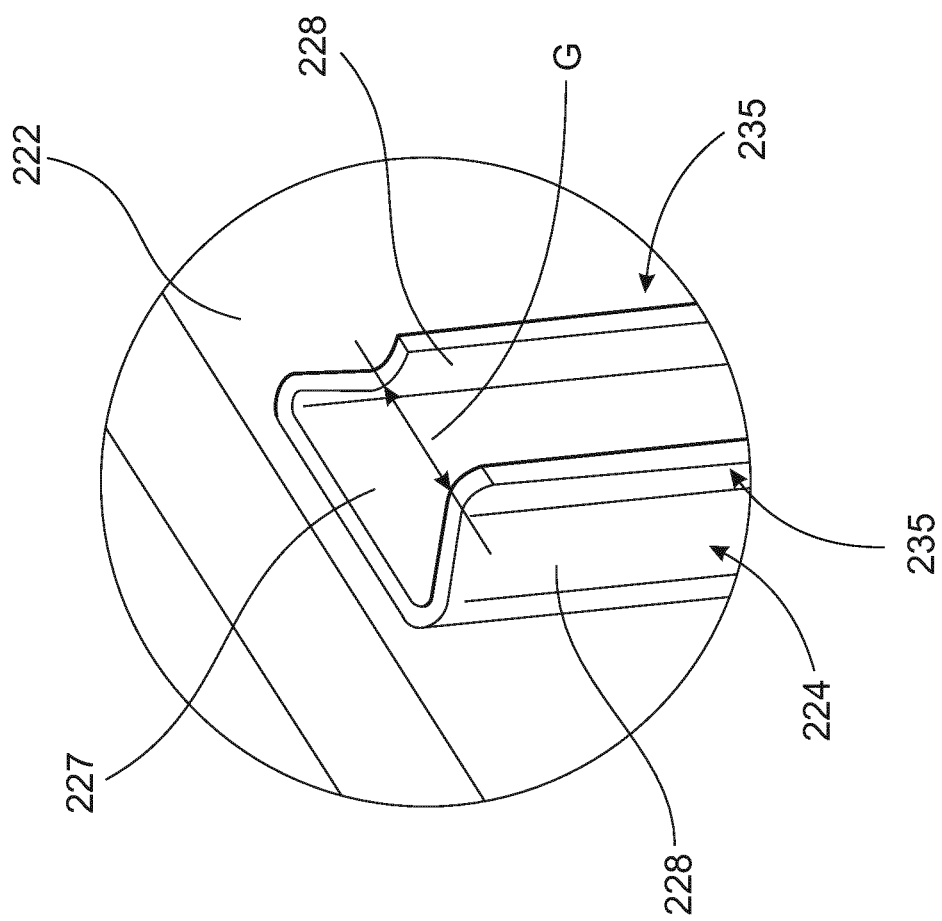
FIG. 6 shows an enlarged view of the locking means in FIG. 5.

FIG. 6 shows an enlarged view of the second part of the locking means in FIG. 5. As can be seen in this figure, the side sections 228 converge in a direction away from the second brake pad and towards the projections 225, 226 in the axial direction of the brake disc. The side sections 228 are arranged to be resiliently displaced away from each other when contacted by a projection 225, 226 to form a snap-on mechanical locking means 223. The parallel outer end portions 235 of the side sections 228 are separated by a gap having a predetermined width G in a plane parallel to the carrier of the second brake pad 222. The width G of the gap is selected to be smaller than the outer dimensions of the head portions 231, 232 of the projections 225, 226 in order to provide a snap-on connection. The outer peripheral dimensions of a stem portion 233, 234 supporting said head portion 231, 232 is reduced relative to the dimension of the head portion, but is sufficient to maintain the outer end portions 235 of the side sections 228 forcibly in contact with the stem portions 233, 234 when the projections 225, 226 has been snapped into the dove tail sheet metal part 224. The parallel outer end portions 235 of the side sections 228 have a short diverging portion along their parallel edges. This diverging portion of the side sections 228 will function as a guide for the respective head portion 231, 232 of the projections 225, 226 when they come into initial contact with the dove tail sheet metal part 224.

According to a first example, the second brake pad 222 is arranged to be mounted axially onto the second side wall 212 by snapping the dove tail sheet metal part 224 onto each projection 225, 226 in the axial direction of the brake disc. According to a second example, the second brake pad 222 is arranged to be mounted radially onto the second side wall 212 by sliding the dove tail sheet metal part 224 onto each projection 225, 226 in the radial direction of the brake disc.

According to the example described above, the projections 225, 226 are located in a radial recess 230 in the second wall 212 on the calliper bridge side 215. In this case, the dove tail sheet metal part 224 extends into the radial recess 230 to connect with the projections 225, 226 so that the brake pad carrier of the second brake pad 222 can be positioned and supported by the second wall 212. According to a second example, the dove tail sheet metal part is located in a radial recess in the carrier of the second brake pad. In this case, the projections can be fixed directly onto the second wall and extend into the radial recess to connect with the dove tail sheet metal part so that the brake pad carrier can be positioned and supported by the second wall.

The present disclosure should not be deemed to be limited to the embodiments described above, but rather a number of further variants and modifications are conceivable within the scope of the following patent claims.

The invention claimed is:
1. A vehicle calliper disc brake comprising:
a calliper housing having first and second side walls arranged on opposite sides of a brake disc and facing each other, wherein the first side wall has at least one piston slidably mounted in a cavity between the first and the second side walls and wherein the second side wall is part of a calliper bridge, the calliper bridge extending from the first wall and spanning the brake disc;
a first brake pad mounted to the at least one piston on a calliper piston side;
a second brake pad mounted to the second side wall on a calliper bridge side; and
a mechanical locking means provided on the calliper bridge, whereby the second brake pad is releasably attached to the second side wall on the calliper bridge side;
wherein the mechanical locking means comprises a dove tail sheet metal part on the second brake pad and at least one projection on the second side wall of the calliper bridge, and the second brake pad is arranged to be mounted axially, by snapping the dove tail sheet metal part onto each projection of the at least one projection.
2. The vehicle calliper disc brake of claim 1, wherein the dove tail sheet metal part is arranged to extend in a radial direction of the brake disc when the second brake pad is mounted to the second side wall of the calliper bridge side.

3. The vehicle calliper disc brake of claim 1, wherein the dove tail sheet metal part comprises a central section attached to the second brake pad and two side sections extending side-by-side in a radial direction.

4. The vehicle calliper disc brake of claim 3, wherein the two side sections converge towards the at least one projection in the axial direction of the brake disc.

5. The vehicle calliper disc brake of claim 4, wherein the two side sections are arranged to be resiliently displaced relative to each other to form a snap-on mechanical locking means.

6. The vehicle calliper disc brake of claim 5, wherein the at least one projection of mechanical locking means comprises at least two projections.

7. The vehicle calliper disc brake of claim 6, wherein the at least two projections are separated in the radial direction of the brake disc.

8. The vehicle calliper disc brake of claim 1, wherein the dove tail sheet metal part has an elongate profile that is open at both ends.

9. A vehicle comprising the vehicle calliper disc brake of claim 1.

* * * * *